United States Patent [19]

Duranton

[11] Patent Number: 5,675,776
[45] Date of Patent: Oct. 7, 1997

[54] DATA PROCESSOR USING FIFO MEMORIES FOR ROUTING OPERATIONS TO PARALLEL OPERATIONAL UNITS

[75] Inventor: Marc Duranton, Boissy Saint Leger, France

[73] Assignee: U.S. Philips Corporation, New York, N.Y.

[21] Appl. No.: 353,584

[22] Filed: Dec. 12, 1994

Related U.S. Application Data

[63] Continuation of Ser. No. 904,732, Jun. 25, 1992, abandoned.

[30] Foreign Application Priority Data

Jun. 28, 1991 [FR] France ..................................... 9108064

[51] Int. Cl.$^6$ ........................................................ G06F 9/00
[52] U.S. Cl. ........................ 395/561; 364/259.9; 364/258; 364/259
[58] Field of Search ..................................... 395/375, 800

[56] References Cited

U.S. PATENT DOCUMENTS

| | | | |
|---|---|---|---|
| 3,938,103 | 2/1976 | Welin | 395/375 |
| 4,240,137 | 12/1980 | Matsumoto et al. | 395/375 |
| 4,734,850 | 3/1988 | Tonii et al. | 395/375 |
| 4,752,873 | 6/1988 | Shonai et al. | 395/375 |
| 4,980,821 | 12/1990 | Koopman et al. | 395/375 |
| 5,070,451 | 12/1991 | Moore et al. | 395/375 |
| 5,179,734 | 1/1993 | Candy et al. | 395/800 |
| 5,301,340 | 4/1994 | Cook | 395/800 |

FOREIGN PATENT DOCUMENTS 0106670  4/1984  European Pat. Off. .

OTHER PUBLICATIONS

The Journal of Forth Application and Research, vol. 2, No. 1, 1984, J.C. Vaughan, R.L. Smith, "The Design of a Forth Computer", pp. 49–64.

Primary Examiner—Kevin J. Teska
Assistant Examiner—Ayni Mohamed
Attorney, Agent, or Firm—Anne E. Barschall

[57] ABSTRACT

The device is adapted more particularly to process programs written in FORTH. The device includes a) a program memory (1) storing instruction data, b) an operational unit (15) comprising a plurality of operational means (16, 17, 18), c) a central decoding unit (35), and d) a stack memory (8) for the return instructions.

11 Claims, 7 Drawing Sheets

DATA PROCESSOR USING FIFO MEMORIES FOR ROUTING OPERATIONS TO PARALLEL OPERATIONAL UNITS

This is a continuation of application Ser. No. 07/904,732, filed on Jun. 25, 1992 now abandoned.

The invention relates to a data processing device comprising:
- a program memory for storing instruction data,
- an operational unit comprising at least one operational means for executing said instructions,
- a central instruction-decoding unit for supplying the operation codes to the operational unit.

Such devices are well known and have a wide field of use. However, currently the programs require an increasing number of instructions, involving a increasing number of operations. The operational units are then loaded to an increasing extent and their structures become increasingly complex. For example, the operational units of microcomputers of the PC type may comprise a first operational means consisting of an arithmetic and logic unit and a second operational means consisting of a mathematical coprocessor dedicated to floating calculations. This leads to coordination problems with the results of the ALU and of the coprocessor.

It is an object of the invention to provide a device of the type defined in the opening paragraph, comprising an operational unit which can be of a complex structure and can consist of a plurality of operational means and in which the problems of coordination and asynchronism have been solved to a large extent.

To this end a device of the type defined in the opening paragraph is characterised in that the device comprises at least one storage means of the FIFO type arranged between the operational means and the central instruction-decoding unit, one or a plurality of executive means being capable of operating in parallel under control of a single instruction decoding unit.

The invention is particularly suited for processors adapted to process chained languages, for example of the FORTH type. For this subject reference is made to European Patent Application no. 0,185,215 or French Patent Application no. 91 08062, fried simultaneously with the present Application. With this type of processor the coordination problems are mitigated even further because it allows for asynchronous operation between the various parts of the device.

In a preferred embodiment of the invention it comprises at least one return-address memory of the stack type and at least one intermediate-data memory of the stack type.

The invention will now be described in more detail, by way of nonlimitative example, with reference to the accompanying drawings.

BRIEF DESCRIPTION OF THE DRAWINGS

FIG. 1 shows a data processing device, more in particular adapted to programs written in FORTH. The program data consisting of instructions and parameters are stored in a program memory 1. This data appears on the output 3 of this memory 1. The address code where this program data is stored is applied to the address input 5 of this memory 1.

Figure 2:
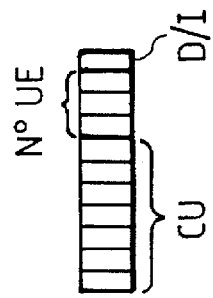
FIG. 2 illustrates the instruction format.
Figure 1:
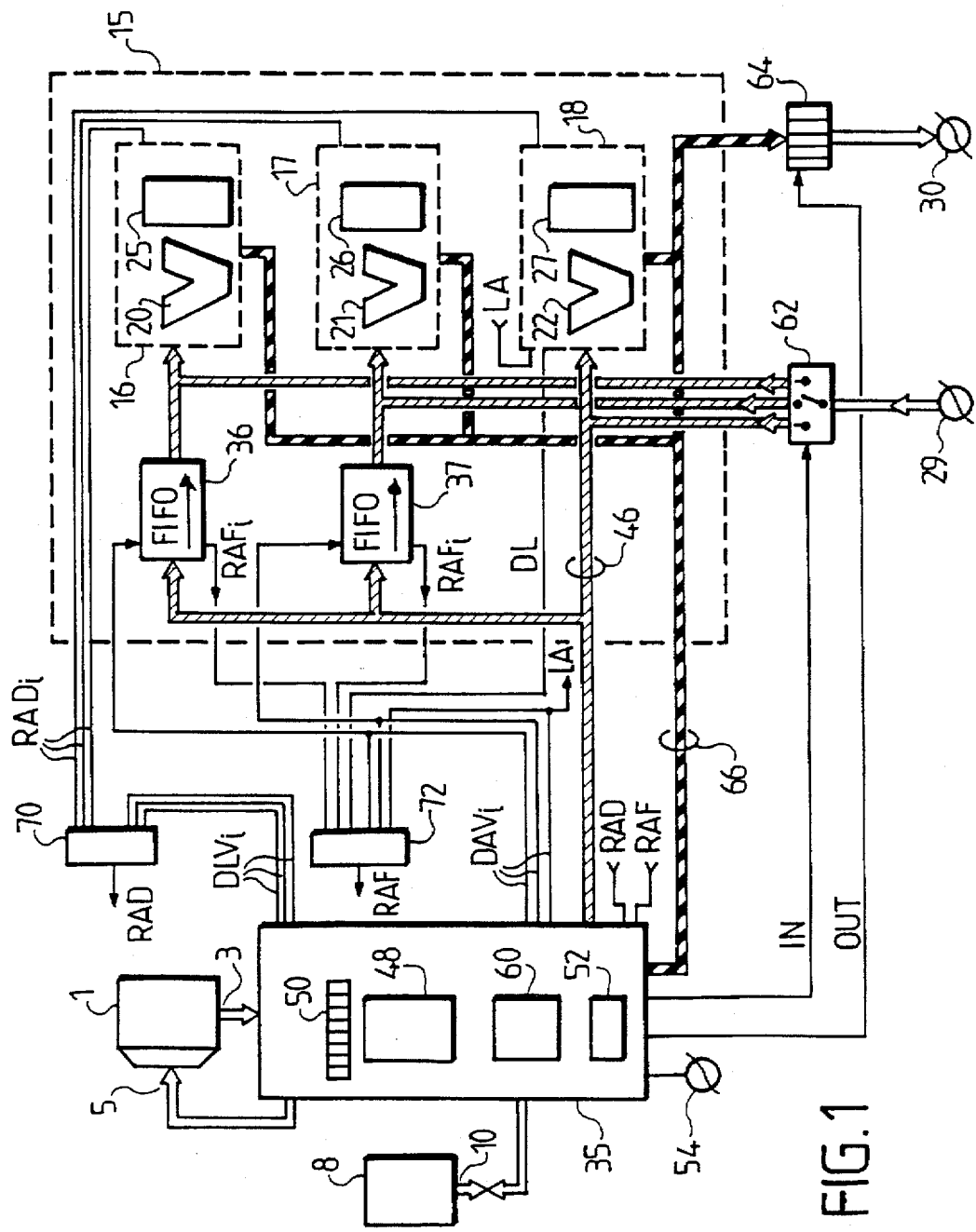
FIG. 1 is a block diagram of a device in accordance with the invention.

A stack-type LIFO memory 8, hereinafter referred to as "return memory", serves to store the address codes for the memory 1. These address codes specify the location in the memory 1 of the instruction to be executed after completion a subprogram. The address codes of this stack memory 8 are available on a port 10. Execution of the instructions and, if required, processing of the various parameters is effected in an operational unit 15 comprising three operational means 16, 17 and 18. These means basically comprise an arithmetic and logical unit ALU 20, 21 and 22 having various possibilities, for example multiplication, may be wired for one of them and not for the other. These units comprise a stack memory 25, 26 and 27 for storing various data, partial results etc.

The processing device has two ports 29 and 30 for external communication, the port 29 for the input and the port 30 for the output of data.

A central decoding unit 35 determines the different data paths between the memories 1 and 8, the operational unit 15 and the ports 29 and 30.

In accordance with one aspect of the invention the operational unit 15 comprises two storage means 36 and 37 constituted by means of memories of the FIFO type, which means are arranged between the unit 35 and the respective operational means 16 and 17. The operational means 18 is connected directly to the unit 35 and a common data line 46 provides the connection between the means 36, 37, the unit 18 and the central decoding unit 35.

The central decoding unit 35 comprises a decoding means 48, which is suitably formed by means of an associative memory with its input register 49, an address or program register 50 for addressing the program memory 1, an interrupt control unit 52, which controls the interrupts in response to signals applied to the input 54 of the unit 35, and a sequencing unit 60 controlling its operation. This unit 35 comprises further elements which will be described in more detail below.

By means of the central unit 35 the data coming from the port 29 can be sent to one of the means 16, 17 or 18 by actuation of a switch 62. The data to be supplied to the output terminal 30 is stored in a buffer register 64 whose lead instruction is obtained from the unit 35. The inputs of this buffer register are connected to a common data line or bus 66. This data output line 66 interconnects the unit 35 to all the units 16, 17 and 18.

The data transmitted via the line 46 is organised in accordance with the format illustrated in FIG. 2. The different bits transmitted in parallel by means of this line 46 form different fields:

CU: data or instructions to be executed,

N°UE: destination of the field CU, i.e. in the present example the number of the operational means 16, 17 or 18; by way of modification this field may comprise as many positions as there are operational means, such that instructions can be executed in parallel by a plurality of said means, D/I: this field comprising one bit specifies whether the field CU is an instruction for the operational unit or data.

Apart from this format the relations between the means 16 to 18 and the central unit 35 are defined by various signals by means of which it is possible to lay down a protocol for the data exchange between the units 35 and 15.

1) Reading

The unit 35 requests the read-out of data stored in one of the stack memories 25, 26 or 27. The data is available and ready when a signal RAD becomes active. This signal is derived as follows from the signals DLVi and RADi. the signals RADi (i=1, 2, 3):

originate from the means 16, 17 and 18 respectively and denote that the data from the memories 25 to 27 is available on the line 66 for reading by the unit 35.

the signals DLVi:

indicate that the unit 35 requests the read-out of the relevant memory 25, 26 or 27.

These signals DLVi and RADi are combined to provide the signal RAD generated by the logic circuit 70, which performs the logic operation:

$$RAD=(DLV1.RAD1)+(DLV2.RAD2)+(DLV3.RAD3)$$

2) Writing or sending an instruction from the unit 35 to one or more of the means 16 to 18, which is effected:

on the one hand, by means of signals $DAV_i$:

supplied by the central unit 35 to indicate that a write request is made (as far as the unit 18 is concerned, the line DAV3 is connected to a line merging with a line LA, which will be explained below), and, on the other hand, by means of signals $RAF_i$:

supplied by the storage means 26, 27 and by the unit 18 via a line DL to indicate that the means 26, 27 and the unit 18 are ready to receive the data.

The signals $RAF_i$ and $DAV_i$ are combined by means of a logic circuit 72 to provide a signal RAF such that:

$$RAF=(DAV1.RAF1)+(DAV2.RAF2)+(DAV3.RAF3)$$

if it is only possible to activate one means at a time.

However, if a plurality of means can be activated the signal RAF should be active when all the means have responded, allowing simultaneous writing in a plurality of means 16 to 18.

It is to be noted that the signal $RAF_3$ coincides with the signal DL from the unit 18 and the signal $DAV_3$ coincides with a signal LA to be applied to this means 18. These signals DL and LA will be clarified below.

Figure 3:
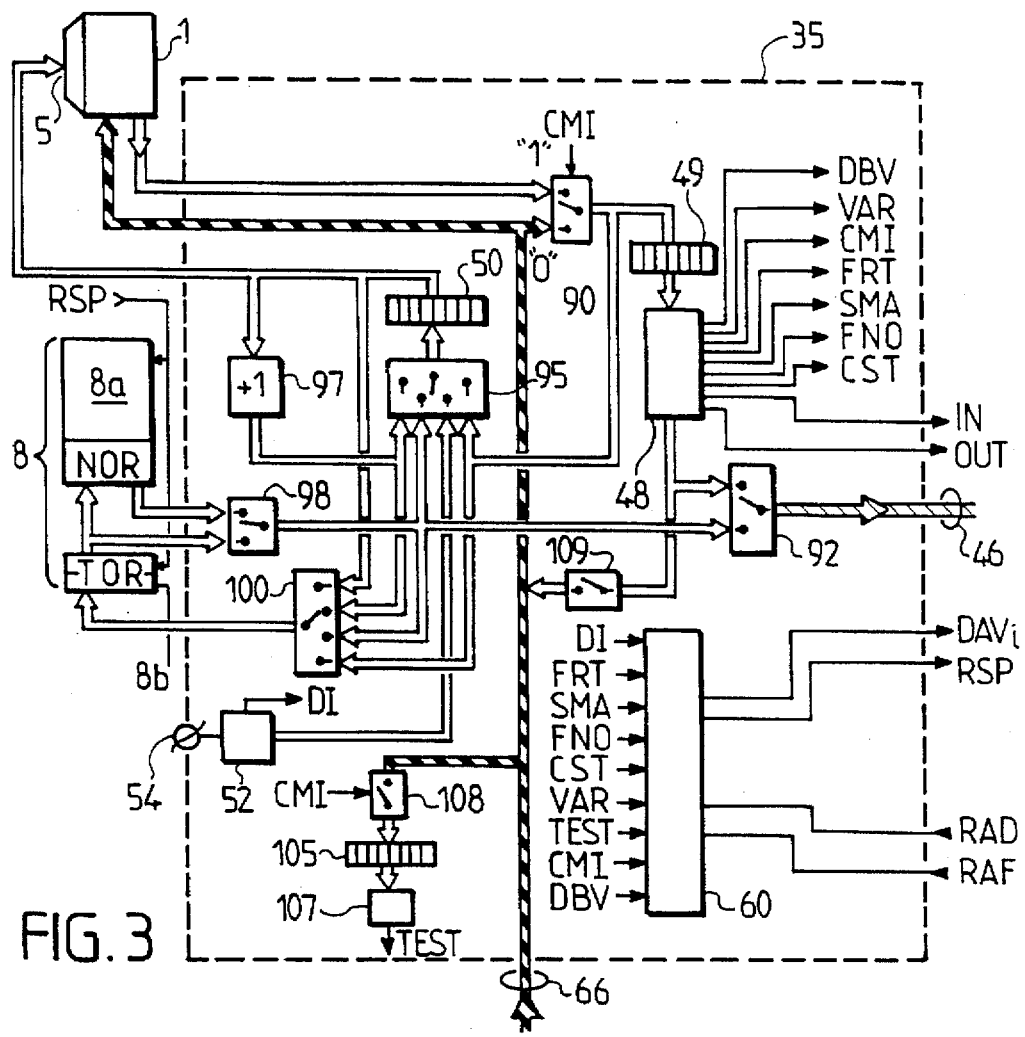
FIG. 3 shows the structure of a central decoding unit.

FIG. 3 shows in detail the central unit 35.

The input of the decoding unit 48 is connected to the output of the program memory 1 via a switching circuit 90 controlled by a signal CMI. In another position this circuit connects the input of the unit 48 to the line 66. The instructions and data to be transmitted from this decoding unit to the various means 16 to 18 are output onto the line 46 via a two-position switching circuit 92. The other data from the stack memory 8 can be transmitted via the line 46 when the circuit 92 is set to its other position. It is to be noted that the memory 8 has two parts:

a part 8a containing all the previous data including the data in the penultimate position NOR of the stack, and a part 8b containing the data at the top TOR of the stack.

The decoding unit 48 also supplies the appropriate signals for certain instructions, for example:

DBV: request for communication with one of the memories 25, 26 or 27,

CMI: sets the switch 90,

FRT: gives the type of return instruction,

SMA: indicates whether the relevant instruction is to be executed by the central decoding unit 35, FNO: indicates a normal form of return instruction CST: indicates that the instruction defines a constant VAR: indicates that the instruction defines a variable IN: enables the input of data from an external source (port 29)

OUT: enables the output of data from the device (port 30).

The address register 50 can be loaded in different ways depending on the position of a switching circuit 95. In a first position an incrementer 97 increments the register contents by one. In a second position the register is loaded with the output data from the stack memory 8 via switch 98. In a third position it is loaded with the address of the interrupt program by means of a unit 52 and in a fourth position it is loaded with the data contents of the program memory 1 via the switch 90.

By means of a four-position multiplexer 100 the part 8b of the stack memory 8 can be loaded with data:

from the register 50, the multiplexer being in a first position, or from the incrementer 97, the multiplexer 100 being in a second position, or from the switch 98, the multiplexer being in a third position, or applied to the output of the switching circuit 90, the multiplexer 100 then being in a fourth position.

In dependence upon the signals DI, FRT, SMA, FNO, CST, VAR, TEST, CMI, DBV, RAD and RAF the sequencing unit 60 generates the following signals:

$DAV_i$: for selecting one of the means 16 to 18,

RSP: for controlling the advance of the stack pointer (memory 8).

There is also a register 105 coupled to a decoder 107 for supplying a TEST signal. This register can be loaded with data from the associative memory 48 or with data conveyed via the line 66. This register 105 is connected to the line 66 by a switch 108 controlled by the signal CMI.

Moreover, it is to be noted that a three-state switch 109 has been provided to enable the output of the decoding unit 48 to be connected to the line 66.

Figure 4:
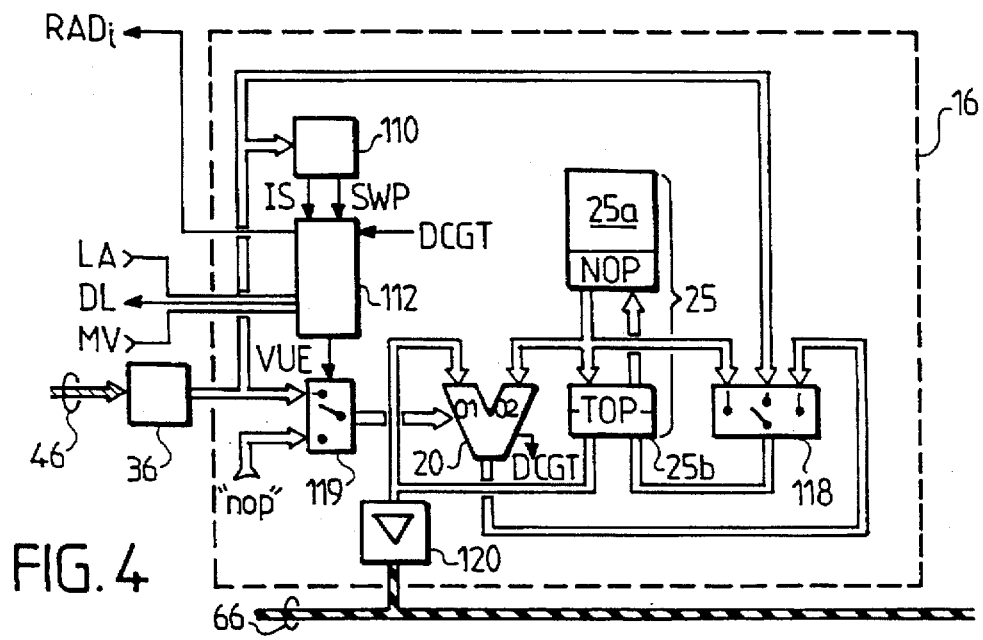
FIG. 4 shows the structure of the operational means.

FIG. 4 shows in greater detail the structure of the operational means 16 and the structure of the means 17 and 18 may be identical.

The means first of all comprise a decoding means 110 to analyse the data on the output of the optional FIFO storage means 36. It supplies two signals:

IS: indicating that it concerns an instruction,

SWP: indicating that the data is addressed to the means 16.

This information is applied to a command means 112, which acts upon a two-position switching circuit 119, in particular by means of a signal VUE. In a first position of said circuit the operation code on the output of the memory 36 is applied to an arithmetic and logical unit 20, and in the other position the unit 20 is inoperative, the operation code then being the code "nop".

The first operand input 01 of the unit 20 is connected to the output of a register 25b forming the top of the stack memory 25. The output of this register is also connected to the other part 25a of the stack memory. The register 25b is a double register of the master-slave type, enabling data on its input to be stored while the preceding data is output. The input of the register 25b is connected to the output of a three-position switch 118. In a first position the input of the register is connected to the output NOP of memory 25, said output being connected to the second operand input 02 of the arithmetic and logical unit 20, in a second position the input of the register is connected to the output of the means 36, and in a third position the register input is connected to the output of the unit 20. An amplifier 120 connects the output of the register 116 to the line 66.

The sequencing circuit 112 also supplies the signal RAD$_i$ and the signals for the communication with the storage means 36 and the memory 25. It supplies the synchronisation signal DL depending upon, in particular, the signals LA and MV. It also receives the signal DCGT from the unit 20. This signal indicates that the unit 20 has finished its operation and is thus available.

Figure 5:
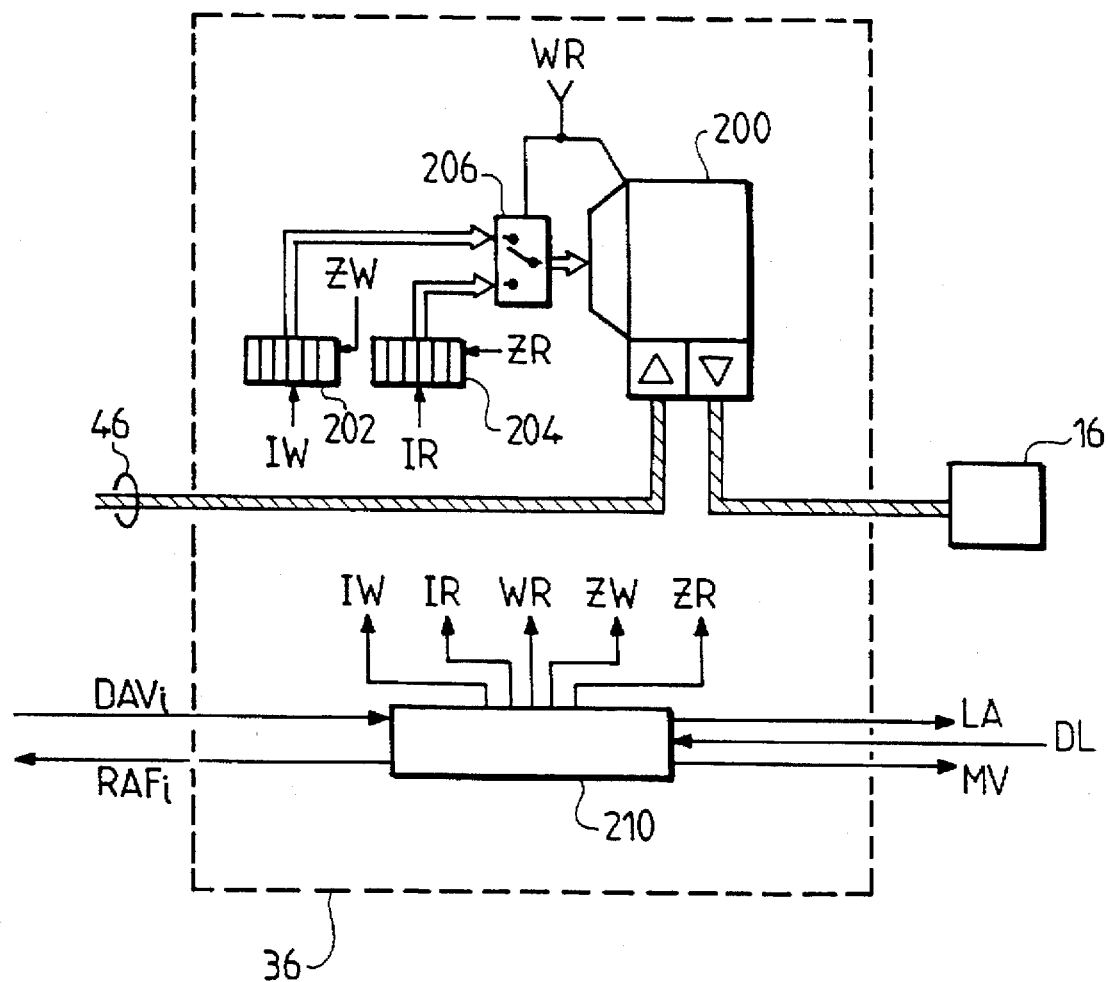
FIG. 5 shows the structure of a storage means.

FIG. 5 shows an example of the FIFO storage means 36, the structure of the means 37 being assumed to be identical.

The storage means 36 is built around a read-write random-access memory arranged as a stack memory. A counter 202, which is incremented on the signals IW (write mode) and set to zero by a signal ZW, is used for writing the data from the line 46 into the memory 200, and a counter 204, which is incremented on the signals IR (read mode) and set to zero by a signal ZR, is used for indicating the read address. For addressing the memory 200 the choice between these two counters is effected by a switch 206 controlled by the write/read signal WR.

Figure 6:
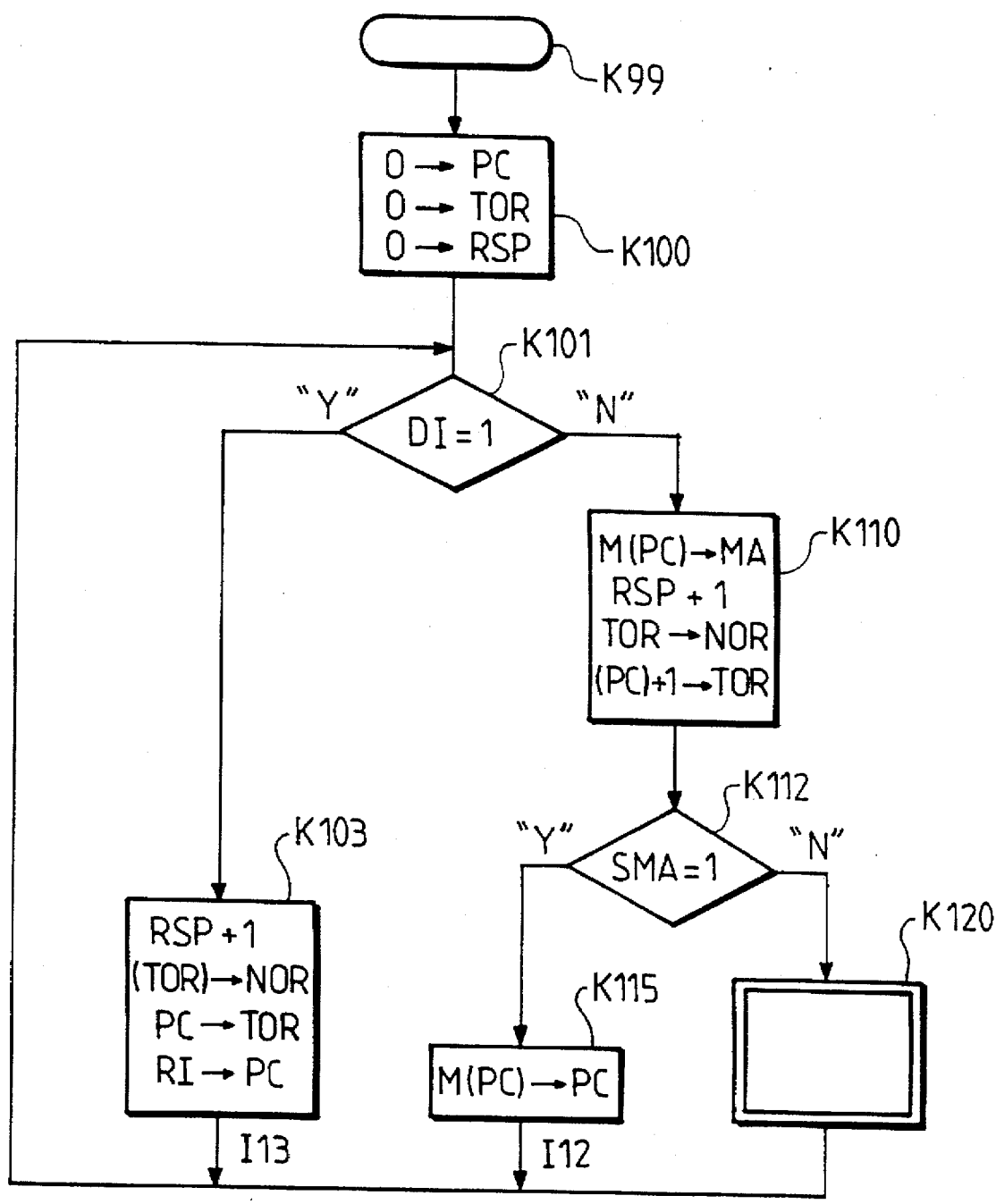
FIGS. 6, 7, 8 show a flow chart defining the operation of the central processing unit.
Figure 7:
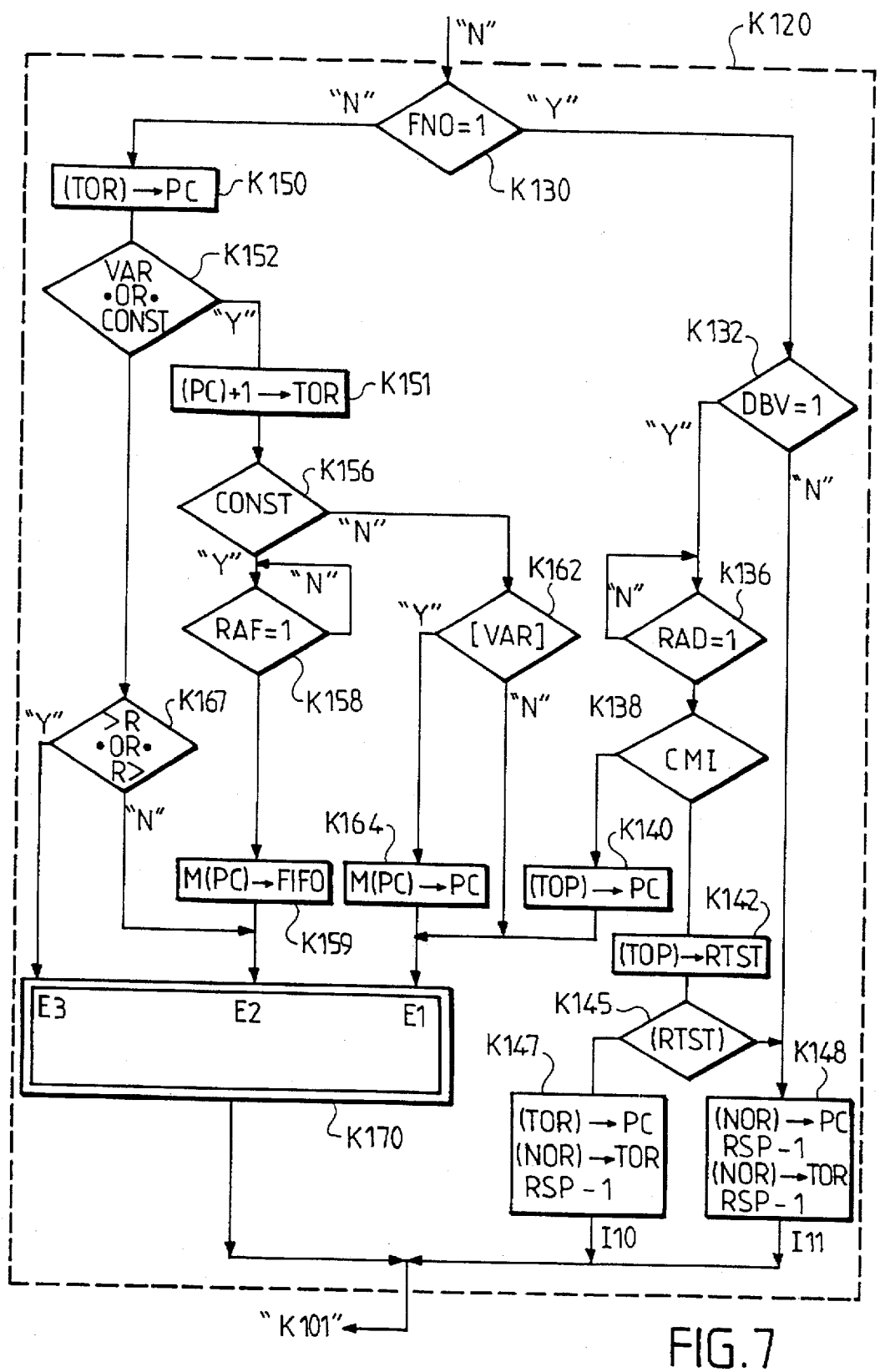
Figure 8:
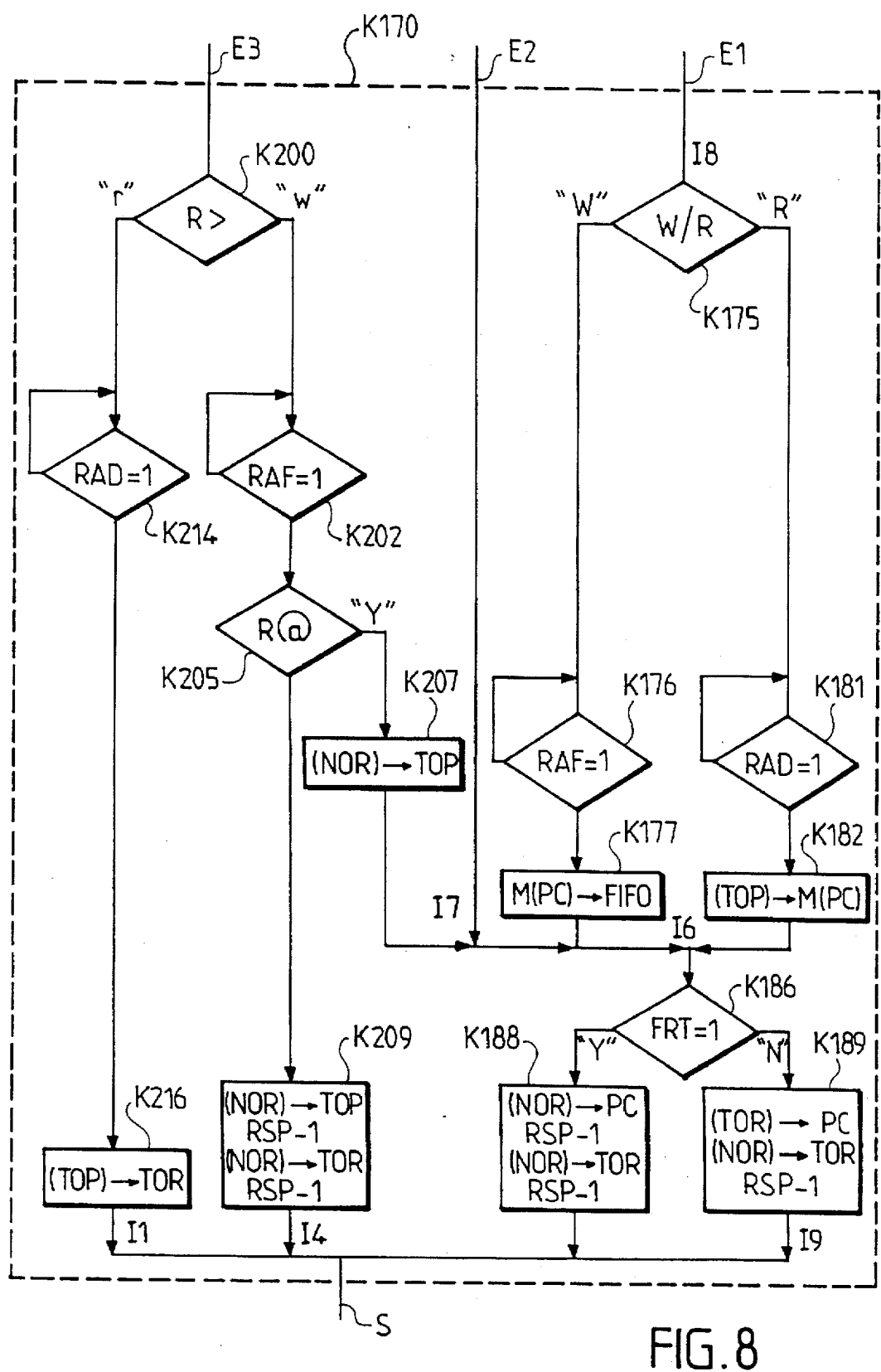
Figure 9:
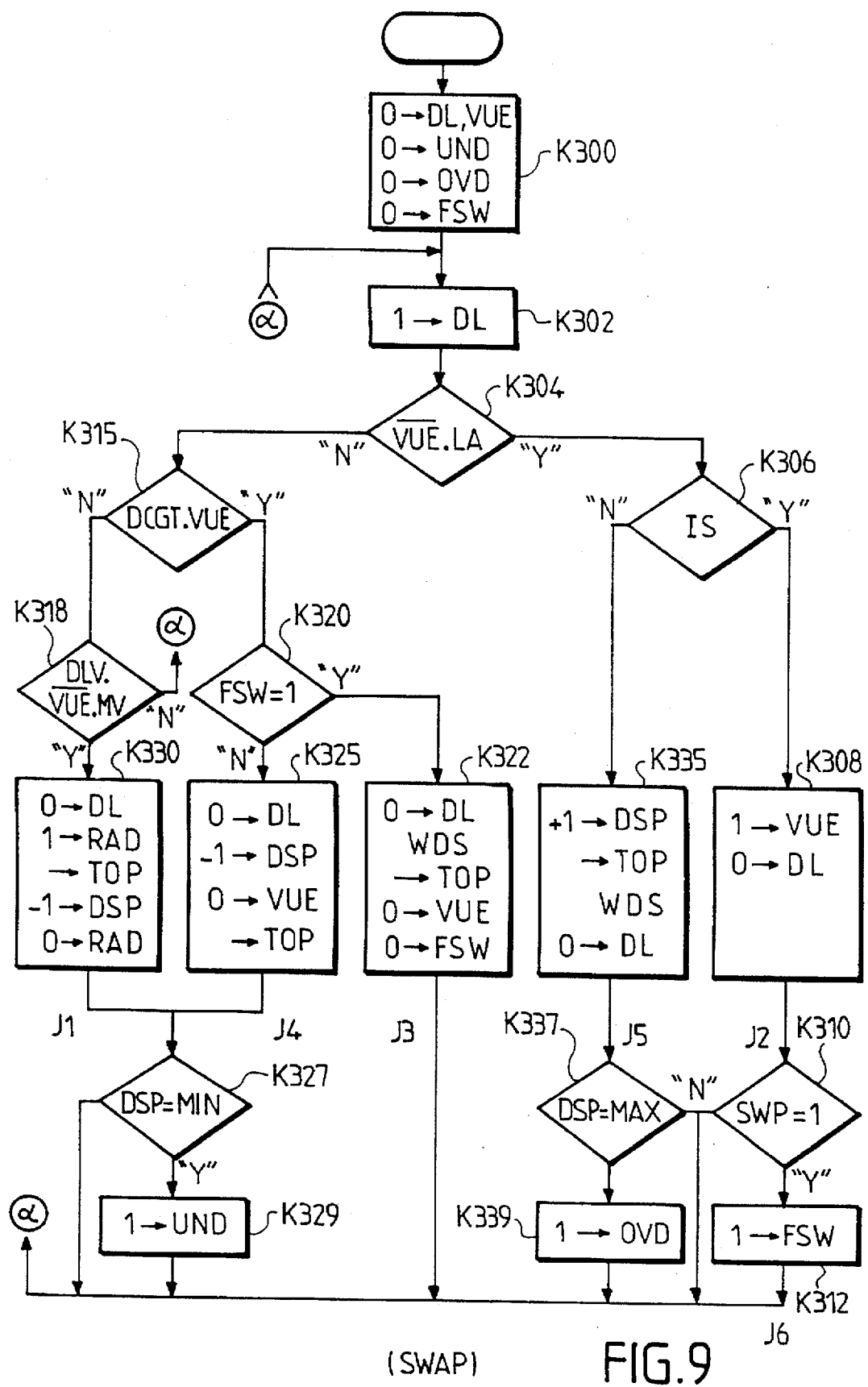
FIG. 9 a flow chart defining the operation of the operational means.

A sequencing circuit 210 dictates the operation of the counters 202 and 204 and controls the protocol for the communication between the unit 16 and the central unit 35 (as indicated hereinbefore by the signals DAVi, RAFi, LA, DL, ML). FLOW CHART OF THE CONTROL MEANS 60 OF THE UNIT 35 (FIGS. 6, 7 and 8).

Annex I lists the operations which can be executed by the unit 35 and the references of the flow-chart blocks which will be described.

The block K990 indicates that the device is set to the initial state.

The block K100 represents an initialisation sequence performed when the device is started.

the contents of the program register 50, referenced PC in the flow chart, is set to zero.

The pointer RSP of the return memory 8 is also initialised.

The top of the stack TOR is set to zero.

The block K101 represents the scanning of the interrupt receiving means. If an interrupt is detected DI="1" on the output of the means 52 the program proceeds to the block 103.

The block 103 represents the preliminary operations for carrying out the requested interrupt program. First of all, the contents of the program register 50 is stacked at the top TOR of the return memory 8 (hence the operations RSP+1 (TOR) →NOR), the multiplexers 100 and 95 being set to the appropriate positions. Subsequently, the address [RI] where the interrupt program starts is read in the interrupt means 52. This value is stored in the program register 50. When the register RI is read this causes DI to be set to zero so that at the end of these preliminary operations the program proceeds to the block K101, the test of DI leading to the block K110.

In this block K110 a series of operations are indicated.

The instruction contained in the program memory 1 is applied to the associative memory 48, referenced MA in the flow charts, via a switching circuit 90. This is written as M(PC)→MA.

The contents of the program memory 50 is incremented by one before it is stored at the top of the stack TOR of the return memory 8.

In the following block K112 the associative memory 48 tests the decoded instruction to detect whether it concerns the sequencing unit 35 or the operational means 16 to 18. In other words, it is ascertained if the instruction is an instruction to be executed or if it is the address of a subprogram or an instruction relating to the program sequence. This operates as follows. If the input data to the associative memory corresponds to a value stored in this associative memory (during initialisation) this is recognised by this memory and is assumed to be an instruction to be executed. If it is not recognised the data is considered to be an address of the subprogram to be executed (for the use of an associative memory reference is made to the Applicant's aforementioned French Patent Application). If it is a subprogram SMA=1 the program proceeds to the block K115, which indicates that the contents of the program memory specified by the program register is transferred to this program register. Subsequently, the program returns to the block K101.

If the test of the block K112 indicates that an instruction is to be executed the program proceeds to the block K120 via a branch "N", the block K120 representing a series of operations shown in the following Figures. After K120 has been completed the program returns to the block K101.

The above-mentioned branch "N" thus terminates at the block K130 in FIG. 7. This block K130 represents a check of the value FNO. This value indicates whether it concerns a subprogram return FNO=1 or not FNO=0.

In the case of a subprogram return the branch "Y" from the block K130 is taken to proceed to the block K132, where it is ascertained whether the signal DBV is "1", meaning that there is a request for one of the data memories 25 to 27. If there is no such request the program proceeds to the block K148. The object of these operations is to perform a subprogram return. The program counter PC is loaded with the second value of the stack NOR, so that two elements of the stack have been cleared.

If the test in the block K132 is positive the program proceeds to the block K136, where the value RAD is checked, i.e. upon the request for access to the memory (see the block K132) the program waits until the access signal RAD indicates that the memory is accessible. Subsequently, the program proceeds to the block K138 where the value of the signal CMI is checked. Depending on this value the top of the stack with the parameter TOP of the memory 25, 26 or 27 is transferred:

either to the program register 50 (block K140), or to the register 105 (referenced RTST in the flow chart), which is a sequence control register forming part of the unit 35 (block K142).

The object of these operations is to interrupt the program sequence in accordance with data obtained from the means 16 to 18 and stored at the top CROP) of their respective memory stacks 25 to 27.

In the block K142 a test is carried out which is indicated in the block K145, i.e. the data contained in the register is checked. Depending on the result of this check the program proceeds to the block K147, where the top of the return stack, situated at position TOR, is stored in the program counter, which corresponds to the sequential execution of the next instruction, prior to which the contents of the program register 50 has been incremented by one (block K110). The execution of these instructions described above enables the data to be output to the exterior, as said data is circulated on the BUS line 66 connected to the port 30 by means of the register 64. It is also possible to proceed from the block K145 to the block K148, which indicates that the contents of the penultimate position NOR of the memory 8 is loaded into the program register 50, which corresponds to a subprogram return. From the blocks K147 and K148 the program proceeds to the block K101 already described.

Returning now to the block K130, the situation is examined in which there is a subprogram return (FNO=1) or there is no such return. If there is no subprogram return the program proceeds to the block K150, which represents a transfer of the data stored at the top TOR of the return memory in the program register 50, which corresponds to the execution in sequence of the next instruction. Subsequently, the program proceeds to the block K151 if a check in the block K152 is positive. The check in the block K152 determines whether an instruction is of the CONST type or of the VAR type in accordance with the FORTH notation. The block K151 indicates that the contents of the program register 50 incremented by one (by the incrementer 97) is stored at position TOR of the memory 8. After the block K151 has been traversed the program proceeds to the block K156 to distinguish between a constant and a variable. In the ease of a constant the branch "Y" is followed. The BUS line 46, which is connected to the data memories of the means 16 to 18, is now taken and the program waits until the availability signal RAF is active (block K158). When RAF is active the data is transmitted via the line 46 (block K159) and enters the means 16 to 18 via or not via the FIFO memory 36 or 37. In the unit 48 the constant is given the format described with reference to FIG. 2.

If the test in the block K156 is negative the branch "N" is taken to proceed to the block K162. In this block the type of instruction is examined as regards a variable (whether it is direct or indirect). If it is indirect the branch "Y" is followed to proceed to the block K164. The program register 50 is re-loaded with the value specified by the contents of the program memory (block K164), in which case it indicates the effective address of the variable. If the variable is indirect the program proceeds to the block K170 to the input "E1".

If the test in the block K152 is negative a test is carried out (block K167) to ascertain if the instruction is of the (>R or R>) type (exchange of return stack with data stack). Depending on the result of this test the branch "Y" or "N" is taken. The block K170, which will be described in detail with reference to FIG. 8, has a port E1 which following the blocks K164, K140 and K162, a port following the block K159 and situated in the branch "N" of the block K167, and a port E3 situated in the branch "Y" of the block K167.

The block K170 will now be described in detail with reference to FIG. 8.

From the port E1 the program proceeds to the block K175 to check whether the variable is to be written or read (W/R). If the variable is to be written into 16 to 18 the accessibility of the buffer memory is checked of the operational unit if it is not connected to a FIFO memory (block K176). If it is, the program proceeds to the block K177 where the transfer is effected.

If the variable is to be read from a means 16 to 18 (branch "R" of the test in the block K175) the program waits until this memory is available, i.e. the value of the signal RAD is checked (block K181) after which in the block K182 the contents of the desired parameter memory is loaded into the program memory at the location indicated by the program counter via the bus 66.

Once the read or write operations have been carried out the program proceeds to the block K186 where the return type is examined: in the case of a normal return the program proceeds to the block K188 where the contents of the program memory at the location NOR is loaded into the program register 50 (the memory is "unstacked" two times). If the test in the block K186 is negative the program proceeds to the block K189 where the contents at the location TOR of the return stack 8 is loaded into the program register after unstacking by one element. The program then executes the instruction at the address following that which has just been executed. From these blocks K188 and K189 the program proceeds to the port S in the flow chart shown in FIG. 7.

The port E2 is connected to the block K186 which represents a similar test for the constants and variables relating to the type of return.

The port E3 is primarily used for the instructions for exchange between the stack memory 8 and the memories 25, 26 and 27. In the block K200 the instructions R>and>R (FORTH notation) are discriminated. In the case of the instruction R> the program proceeds to the block K202, where the availability of the relevant operational means is checked and awaited. After this, it is checked in the block K205 whether the instruction R> is of the type R@. An instruction of the type R@ simply means a transfer between the memory 8 (position NOR) and the parameter memory of the relevant unit (block K207), and if the instruction is not of this type unstacking of the memory 8 is necessary (block K209).

The check in the block K200 may show that the instruction is an instruction >R. The availability of the data from the relevant unit is awaited by testing the signal RAD in the block K214. Once the data has arrived it is loaded into the memory 8 as indicated in the block K216.

The flow chart in FIG. 8 shows a port S, which is the common output point of the blocks K188, K189, K209 and K216.

FLOW CHART OF THE CONTROL MEANS OF THE OPERATIONAL MEANS (FIG. 9):

Annex II lists the operations performed by these means and the references of the flow-chart blocks which will be described.

This flow chart starts with the block K300, which represents an initialisation sequence in which the signals DL, VUE and the flags UND, OVD and FSW are set to zero. In the next block K302 the signal DL, which indicates that the operational means is available, is set to "1". The test in the block K304 is positive if, starting from the afore-mentioned initial conditions, the signal LA assumes the value "1". In the block K306 it is now checked whether the data from the means connected to the bus 46 is an instruction (check of a value IS). If it is an instruction it should be executed and therefore it is applied to the unit 20, FIG. 4. Subsequently, it is checked whether this instruction is a SWAP instruction (check of SWP in the block K310). If this check is positive the flag FSW is set (block K312) and this check is negative the program proceeds to the branch "α" leading to the block K302. Since VUE has been set to "1" the check in the block K304 is negative. As a result, the program proceeds to the block K315 which, to become positive, should wait until the signal DCGT becomes active, DCGT=1 denoting that the ALU is available. If this is not the case, the check in the block K318 results in a return to the block K302. When the check in the block K315 is positive the program proceeds to the block K320, which checks the value of the flag FSW which may have been set in the block 312. If FSW=1 (SWAP instruction) different steps are taken as is indicated in the block K322. The signals DL and VUE are set to "0", the flag FSW is reinitialised, and the data on the output of the ALU is loaded into the data memory in position TOP. Thus, the two values have been exchanged via the unit 20 in the following manner: the contents of TOP is in the register 25b, and the contents of NOP in the memory 25 is transmitted to the operand input 02 of the ALU 20. On the output of the ALU 20 the contents of NOP is transmitted to the input of the register 25b via the multiplexer 118, the command WDS enables the contents of the register 26b to be written into the memory 25 in the part 25a at position NOP, and the value at the input of the register 26b is stored in TOP (contents of the second part of the register 26b) so that the required exchange is obtained at the end of this process.

If the check in the block K320 is negative the program proceeds to the block K325, where the values of the signals DL and VUE are set to "0", the pointer of the data memory is decremented by one, and the result on the output of the ALU is stacked at the top. Thus, the contents of TOP and NOP are subjected to an operation and the result is stored in TOP (register 26b). Subsequently, in the block K327 it is checked of the pointer of the memory has its minimum value. If this is the case, a flag UND is set to "1" (block K329). It is then possible to apply an interrupt signal to the circuit 52 in order to generate an interrupt. If said minimum is not reached the branch "α" to the block K302 is followed.

In the block K318 it is detected whether communication from the operational means to the decoding means (16 to 35) is requested via the line 66. If this is the case DLV=1. For a positive result of the check in the block K318 it is required that DLV.VUE.MV=1. The signal MV=1 implies that the FIFO memory is empty.

This ensures the operational synchronism between the unit 30 and the various means 16, 17 and 18. The data from the register 26b (TOP) is applied to the bus via the amplifier 120 and subsequently the values "0" and "1" are assigned to the signals DL and RAD. The data NOP is then loaded into the register 26b TOP), the pointer DSP is decremented by one and the signal RAD is set to zero (block K330). The program then proceeds to the block K327 already described.

Now the check in the block K306 is referred to again. If the data is not an instruction the program proceeds to the block K335, where the pointer of the data memory (DSP) is incremented by one, the data is stored at position TOP of this memory, subsequently WDS is acted upon to copy the old value of TOP into NOP (write signal at the stack), and the signal DL is set to "0". Thus, data is loaded from the unit 35 into the stack memory of the operational unit. Subsequently, the pointer is tested in the block K337 to ascertain if its value has not reached the permissible maximum. If the maximum is not reached the branch α to the block K302 is followed. If the maximum is reached the signal OVD is set to "1" to indicate that overflow of the memory is imminent. It is also possible to generate an interrupt.

OPERATION OF THE BUFFER MEMORY CONTROL MEANS:

In brief, there are three parallel processes for the FIFO by means of which the storage means 36 and 37 are formed.

source:
The central unit 35 wishes to write into the FIFO. It does so if the memory is not full and it increments the input pointer.

user:
The operational means 16 or 17 reads the FIFO. If the latter is not empty the output pointer is incremented by said means.

check:
If the output pointer=the input pointer the FIFO is empty.
If the input pointer=the output pointer minus 1 the FIFO is full.

ANNEX I

| OPERATIONS | REFERENCE IN FLOW CHART | BLOCK NO. WHERE SELECTION OF THE OPERATIONS ENDS |
|---|---|---|
| >R | I1 | K216 |
| R> | I4 | K209 |
| R | I7 | K207 |
| IMMEDIATE FETCH or STORE | I6 | K177, K182 |
| CONSTANT | I7 | K159 |
| VARIABLE | I8 | K175 |
| RETURN CONDITION | I10 | K147 |
| SUBPROGRAM RETURN | I11 | K148 |
| SUBPROGRAM CALL | I12 | K115 |
| INT. PROCESSING | I13 | K103 |

ANNEX II

| OPERATIONS | REFERENCE IN FLOW CHART | BLOCK WHERE THE OPERATION HAS PRACTICALLY ENDED |
|---|---|---|
| UNLOADING | J1 | K330 |
| 1-TERM OPERATION* | J2 | K308 |
| SWAP | J3 | K322 |
| 2-TERM OPERATION** | J4 | K325 |
| LOADING | J5 | K335 |

*ALU operation without stacking/unstacking (TOP→TOP)
**ALU operation with unstacking

ANNEX III

LIST OF REFERENCES USED

| | |
|---|---|
| ALU | arithmetic and logical unit of the operational means 16, 17, 18 |
| CMI | signal from the decoding unit 48, which in particular sets the switch 90 |
| CST | indicates that the instruction defines a constant |
| DAV | signal supplied by the central unit to request access to the FIFO memories 36 and 37 or directly to the unit 18, i = 1, 2, 3 |
| DVB | signal produced by the decoding unit 48 to request communication with one of the memories 25, 26 or 27 |
| DCGT | availability of the ALU 20, 21 or 22 |
| DI | supplied by the circuit 52 to start an interrupt program |
| DL | availability of the operational means (16, 17 or 18) |
| $DLV_i$ | signals from the central unit 35 to request read-out of the memories 25, 26 and 27 |
| DSP | pointer of the memory 25, 26 or 27 |
| FIFO | memory in which the first input data item is the first output data item |
| FNO | indicates a normal type of return instruction |
| FRT | specifies the type of return instruction |
| FSW | flag indicating the SWAP instruction (swap TOP and NOP) |
| IN | enables the entry of data from an external source (port 29) |
| OUT | enables the output of data from the BUS line 66 on the port 30 |
| IR | incrementation of the read counter of the memory 20 (FIFO memory) |
| IS | signal generated by the decoding means 110, which forms part of the operational means 16, to indicate that an instruction is involved |
| IW | incrementation of the write counter of the memory 200 (FIFO memory) |
| LA | signal indicating that the memory 36 or 37 can be read by the means 16 or 27 or that the data can be taken directly from the line 46 (in the case of the means 18) |
| MA | associative memory forming the decoding means 48 |
| M | program memory 1 |
| MV | signal indicating that the memory 36 or 37 is empty |
| NOP | penultimate element of the stack formed by the memories 25, 26 or 27 |
| OUT | enables the output of data from the device (port 30) |
| OVD | overflow of the memory 25, 26 or 27 |
| PC | register 50 |

ANNEX III-continued
LIST OF REFERENCES USED

| | |
|---|---|
| RAD | signal indicating that the data from the operational means are available for the central unit 35 |
| $RAD_i$ | signals from each of the means 16, 17, 18 (i = 1, 2, 3), indicating that the data from the memories 25 to 27 are available |
| RAF | indicates that access to the FIFO storage means 26 or 27 is allowed |
| $RAF_i$ | signals from each of the FIFO storage means to indicate that they are available |
| RI | contents of the interrupt register (52) |
| RSP | pointer of the return memory (8) |
| RTST | test register 105 |
| SMA | indicates whether or not the relevant instruction is to be executed by the central decoding unit 35 |
| SWP | signal generated by the decoding means 110, which forms part of the operational means 16, to indicate that a data is addressed to the means 16 |
| TEST | signal generated by the circuit 107 |
| TOP | top of the stack formed by the memory 25, 26 or 27 |
| TOR | top of the stack constituted by the memory 8 |
| UND | signal indicating dumping of the memory 25, 26 or 27 |
| VAR | indicates that the instruction defines a variable |
| VUE | validation of the ALU 20 by the instruction decoder 112 of the means 16 |
| W | writing or reading of data in the memory 25, 26 or 27 |
| WDS | signal for writing data into the stack memory 25, 26 or 27 |
| WR | writing into or reading from the memory 200 (FIFO memory) |
| ZR | zero reset of the read counter of the memory 200 (FIFO memory) |
| ZW | zero reset of the write counter of the memory 200 (FIFO memory) |

I claim:

1. A data processing device comprising
a program memory for storing instruction data;
a central instruction decoder connected to the program memory for decoding instruction data and supplying operation codes;
an operational unit comprising a plurality of operational means executing the operation codes in parallel; and
routing circuitry for routing the operation codes from the central instruction decoder to the operational units for parallel execution, the routing circuitry comprising at least one FIFO type memory, arranged between at least one of the operational units and the central instruction decoder, said at least one FIFO type memory being for providing operation codes, under control of the routing circuitry, to the at least one of the operational units, wherein the routing circuitry comprises means for controlling access to said the at least one FIFO type memory by means of aggregated signals derived from said at least one FIFO type memory and said at least one operational means and/or at least one other FIFO type memory; the aggregated signals being coupled to the instruction decoder.

2. A data processing device as claimed in claim 1, characterised in that it comprises at least one return-address memory of the stack type and at least one intermediate-data memory of the stack type.

3. A data processing device as claimed in claim 1, characterised in that it is more particularly adapted to process the FORTH language.

4. A data processing device as claimed in claim 1, characterised in that the central decoder comprises a decoding unit formed by an associative memory.

5. A data processing device as claimed in claim 1, characterised in that at least one of the operational means comprises an arithmetic and logical unit and a stack memory for the data.

6. A data processing device as claimed in claim 5, characterised in that it comprises a BUS line for transferring the data contained in the stack memory to the central decoding unit.

7. A device as claimed in claim 1, characterised in that each operation code can be carried out by a single operational means at a time.

8. A device as claimed in claim 1, characterised in that the operation codes are loaded into the at least one FIFO type memory after it has been ascertained that the at least one FIFO type memory is empty.

9. A device as claimed in claim 1, also comprising separate input and output busses connected to the operational unit.

10. The device of claim 1 wherein each of the operational units comprises a respective ALU.

11. The device of claim 1 wherein the central instruction decoder supplies destination codes and the routing means uses the destination codes to route the operation codes to appropriate operational units.

* * * * *